UNITED STATES PATENT OFFICE.

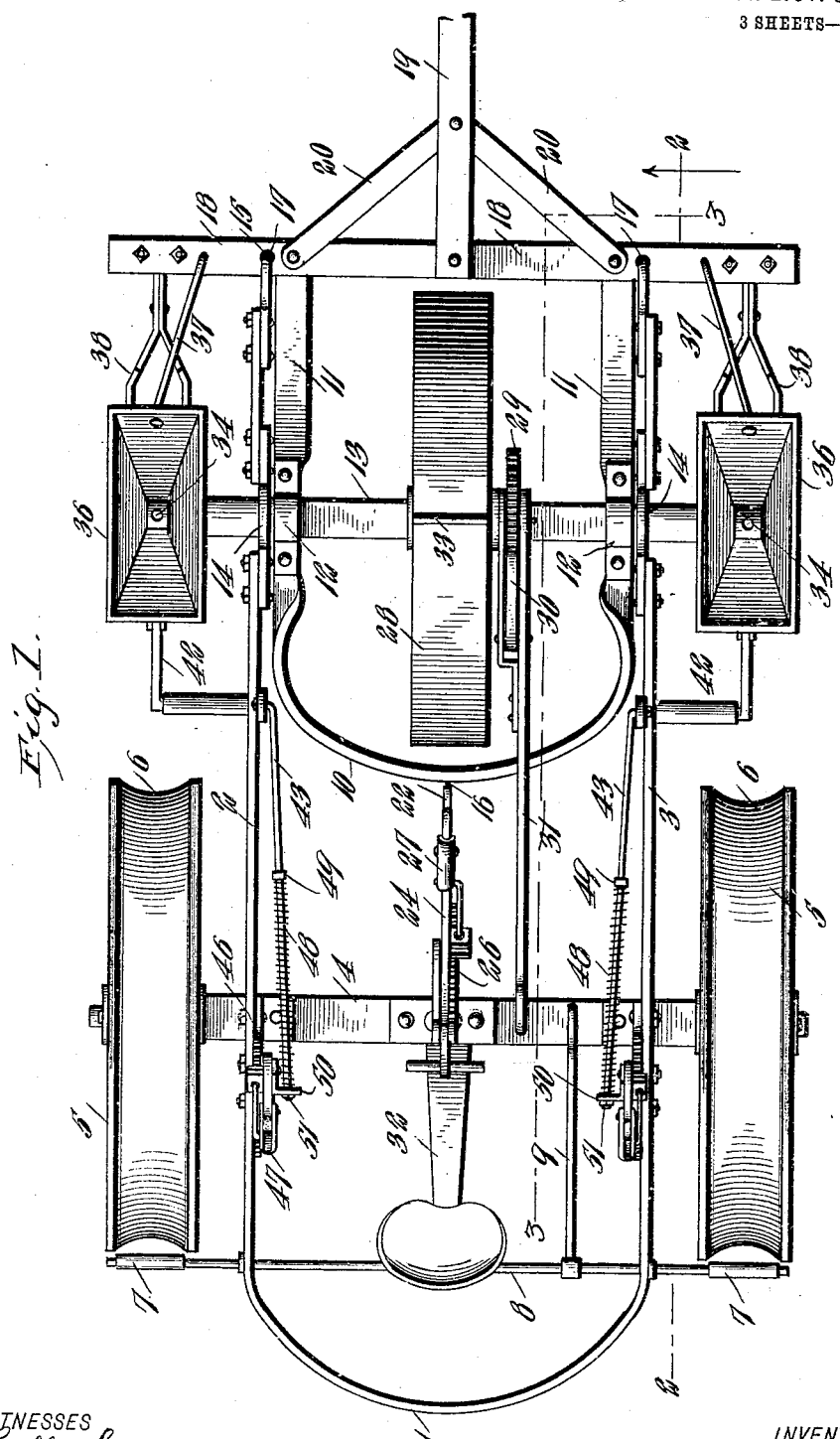

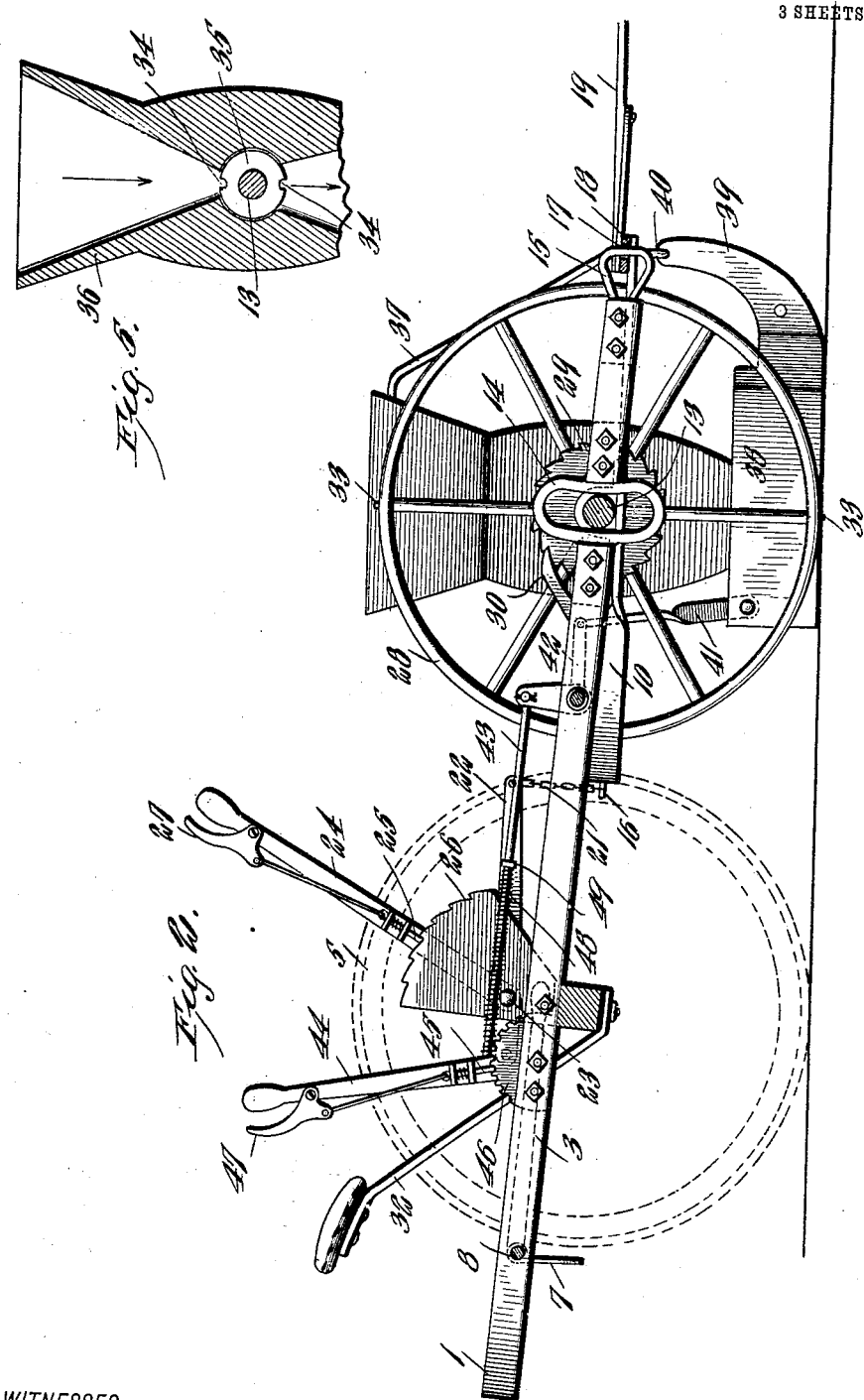

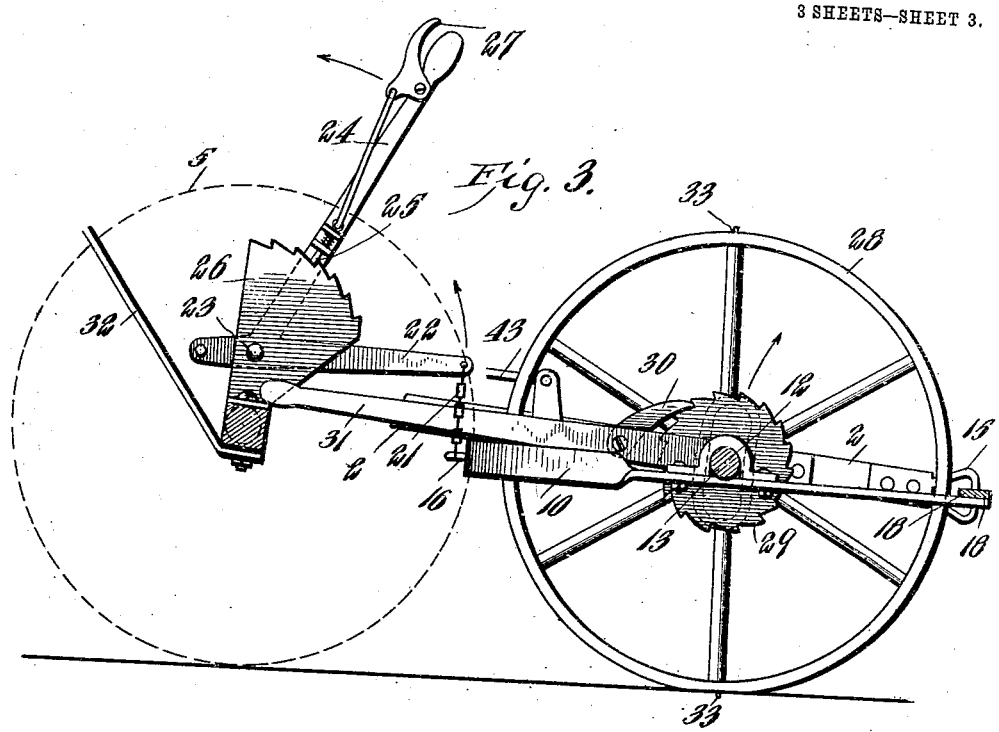
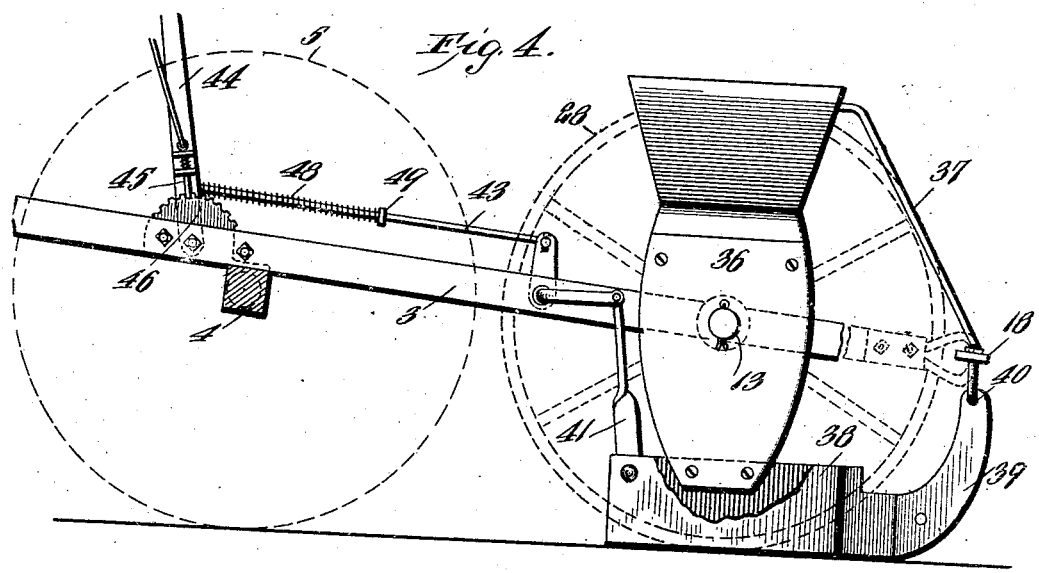

COLONEL W. LANHAM, OF HUSTONVILLE, KENTUCKY.

CORN-PLANTER.

939,717.

Specification of Letters Patent.

Patented Nov. 9, 1909.

Application filed August 29, 1908. Serial No. 450,814.

*To all whom it may concern:*

Be it known that I, COLONEL W. LANHAM, a citizen of the United States, and a resident of Hustonville, in the county of Lincoln and State of Kentucky, have made certain new and useful Improvements in Corn-Planters, of which the following is a specification.

My invention is an improvement in corn planters, and consists in certain novel constructions and combinations of parts hereinafter described and claimed.

Referring to the drawings forming a part hereof—Figure 1 is a plan view of the improvement, Fig. 2 is a section on the line 2—2 of Fig. 1, Fig. 3 is a section on the line 3—3 of Fig. 1; Fig. 4 is a side view partly in section, and Fig. 5 is a central longitudinal section of one of the hoppers partly broken away.

The present embodiment of my invention, comprises a substantially U-shaped frame 1, the sides 2 and 3 of the frame projecting forwardly, and a shaft or axle 4 is secured transversely of the frame at approximately the center thereof, and covering wheels 5 are journaled on the ends of the shaft. The periphery of the wheels 5 is concaved as shown at 6.

Adjacent to each wheel is arranged a scraper 7 secured to a shaft 8, journaled on the U-shaped frame 1, the said shaft having an arm 9 rigid therewith whereby the scrapers may be moved into contact with the peripheries of the wheels to clean them.

An auxiliary frame 10 also U-shaped and having its sides 11 projecting forwardly, is arranged between the sides 2 and 3 of the rear or main frame, and the said sides 11 of the auxiliary frame are provided at approximately their center with vertically arranged bearings 12, in which is journaled a shaft 13, the shaft extending beyond the frame 1, at each side thereof, and having at the ends thereof dropping mechanism to be presently described.

The main frame 1 is provided adjacent to the shaft 13 with vertically arranged loops 14, in which move the ends of the shaft, thus permitting the shaft to move vertically with respect to the main frame and the free ends of the arms are provided with loops 15, which engage openings 17 in a cross-bar 18 secured to the arms 11 of the auxiliary frame, and having connected to the center thereof a tongue 19 braced against the cross-bar by braces 20.

The rear end of the auxiliary frame 10 at approximately the center of the body portion thereof is provided with a staple 16, to which is secured one end of a chain 21 the other end being connected to an arm 22 of a rock shaft 23 journaled on the main frame and having secured thereto a lever 24 provided with a spring actuated tooth 25 for engaging a toothed quadrant 26, whereby to retain the lever in its adjusted position; the lever being provided with a grip 27 for manipulating the tooth.

It will be evident from the description, that when the lever 24 is moved rearwardly the rear end of the auxiliary frame 10 is moved vertically with respect to the main frame, the said frames being pivotally connected at their front end by means of the cross bar 18 which is pivoted to the sides 2 and 3 of the main frame, and rigidly secured to the sides 11 of the auxiliary frame 10. At the center of the shaft 13 is secured a power wheel 28, which has secured thereto a ratchet wheel 29 engaged by a pawl 30 on a lever 31 journaled on the shaft, the free end of the lever extending to a point adjacent to the driver seat 32 as shown in Fig. 1. The periphery of the power wheel 28 is provided at diametrically opposite points with ribs 33, the said ribs being in alinement with openings 34 in the seed dropping wheels 35, which are secured to the outer ends of the shaft 13 within hoppers 36, the said hoppers being supported by the shaft 13 and by braces 37 extending from the hoppers to the cross bar 18 before mentioned.

It will be evident from the description, that the openings 34 for receiving the corn from the hopper and dropping it in the furrow may be brought into proper register to receive a charge of corn by manipulating the lever 31 to rotate the power wheel and the shaft. By this arrangement, corn may be dropped evenly, the hills in each row being in alinement with the hills in every other row.

A shoe or furrow opener 38 is arranged below each hopper, the shoe being of ordinary construction, and having its front end curved upward as at 39 and connected by a link 40 with the cross bar 18, the rear end of the shoe being engaged by a link 41 connected with one arm of a rock lever 42, the other arm being connected by a link 43 with a lever 44 journaled on the frame, and provided with a spring actuated tooth 45 for engaging a toothed quadrant 46 secured to the frame, the tooth being operated by a grip 47.

A spring 48 encircles the link 43 being arranged between a collar 49 on the link and a lug 50 on the lever, the lug being perforated to permit the passage of the link, which is retained in position by a nut 51. It will be evident that should the shoe be engaged by a rock or other obstruction, and lifted thereby, the arrangement just described will permit the said lifting motion, the link 43 moving through the lug and being returned to its original position by the spring 48.

It will be evident from the description, that the auxiliary frame carrying the power wheel and the dropping mechanism is vertically movable with respect to the main frame, and that the said auxiliary frame may be tilted with respect to the main frame by means of the lever 24 and the connecting chain 21. When the lever 24 is manipulated to tighten the chain whereby to lift the rear end of the auxiliary frame, the said auxiliary frame is made rigid with respect to the rear frame so far as upward motion is concerned, and is supported solely by the tongue and the main frame.

When the lever 24 is operated to loosen the chain, then the power wheel 28 is free to follow the inequalities of the ground regardless of the position of the wheels of the main frame and of the tongue.

I claim:

1. A corn planter comprising a substantially U-shaped frame, a cross bar to which the ends of the arms of the frame are pivotally connected, a tongue rigid with the cross bar, a shaft arranged transversely of the main frame covering wheels on the ends of the shaft, an auxiliary frame having arms of lesser length than the arms of the main frame arranged therebetween, said arms having their free ends rigid with the cross bar, a shaft journaled transversely of the auxiliary frame the arms of the main frame being provided with vertical loops through which the ends of the shaft pass a power wheel at the center of the shaft a ratchet wheel rigid with the power wheel, a lever journaled on the shaft, a pawl on the lever for engaging the ratchet wheel to rotate the power wheel, hoppers on the main frame through which the ends of the shaft pass, dropping wheels on the ends of the shaft within the hopper, said dropping wheels being provided at spaced intervals with openings for receiving the charge, the power wheel being provided on its peripheral surface with ribs corresponding to the position of the charge openings on the dropping wheels, a rock shaft on the main frame, an arm projecting from the rock shaft, a chain connecting the free end of the arm with the auxiliary frame, and a lever for manipulating the shaft whereby to raise and lower the rear end of the auxiliary frame.

2. A corn planter comprising a substantially U-shaped frame, a cross bar to which the ends of the arms of the frame are pivotally connected, a tongue rigid with the cross bar, a shaft arranged transversely of the main frame covering wheels on the ends of the shaft, an auxiliary frame having arms of lesser length than the arms of the main frame arranged therebetween, said arms having their free ends rigid with the cross bar, a shaft journaled transversely of the auxiliary frame the arms of the main frame being provided with vertical loops through which the ends of the shaft pass a power wheel at the center of the shaft, dropping mechanism at each end of the shaft, a rock shaft on the main frame, an arm projecting therefrom, a chain connecting said arm with the auxiliary frame, and a lever for manipulating the shaft whereby to raise and lower the auxiliary frame.

3. A corn planter comprising a substantially U-shaped frame, a cross bar to which the ends of the arms of the frame are pivotally connected, a tongue rigid with the cross bar, a shaft arranged transversely of the main frame covering wheels on the ends of the shaft, an auxiliary frame having arms of lesser length than the arms of the main frame arranged therebetween, said arms having their free ends rigid with the cross bar, a shaft journaled transversely of the auxiliary frame the arms of the main frame being provided with vertical loops through which the ends of the shaft pass, a power wheel at the center of the shaft, dropping mechanism at each end of the shaft, and means for raising and lowering the rear end of the auxiliary frame.

4. A corn planter comprising a substantially U-shaped frame, a tongue connected with the frame, a shaft arranged transversely of the frame, covering wheels on the ends of the shaft, an auxiliary frame arranged between the arms of the main frame, a shaft journaled transversely of the auxiliary frame, the arms of the main frame being provided with vertical loops through which the ends of the shaft pass, a power wheel on the shaft within the auxiliary frame, dropping mechanism at each end of the shaft, and means for raising and lowering the rear end of the auxiliary frame.

COL. W. LANHAM.

Witnesses:
 FRANK A. VOILES,
 FREDERIC D. JORDAN.